Nov. 2, 1954     G. W. GUSTAFSON     2,693,210
FRUIT AND VEGETABLE COVER, SEGMENTER AND SLICER
Filed Oct. 30, 1950     3 Sheets-Sheet 1
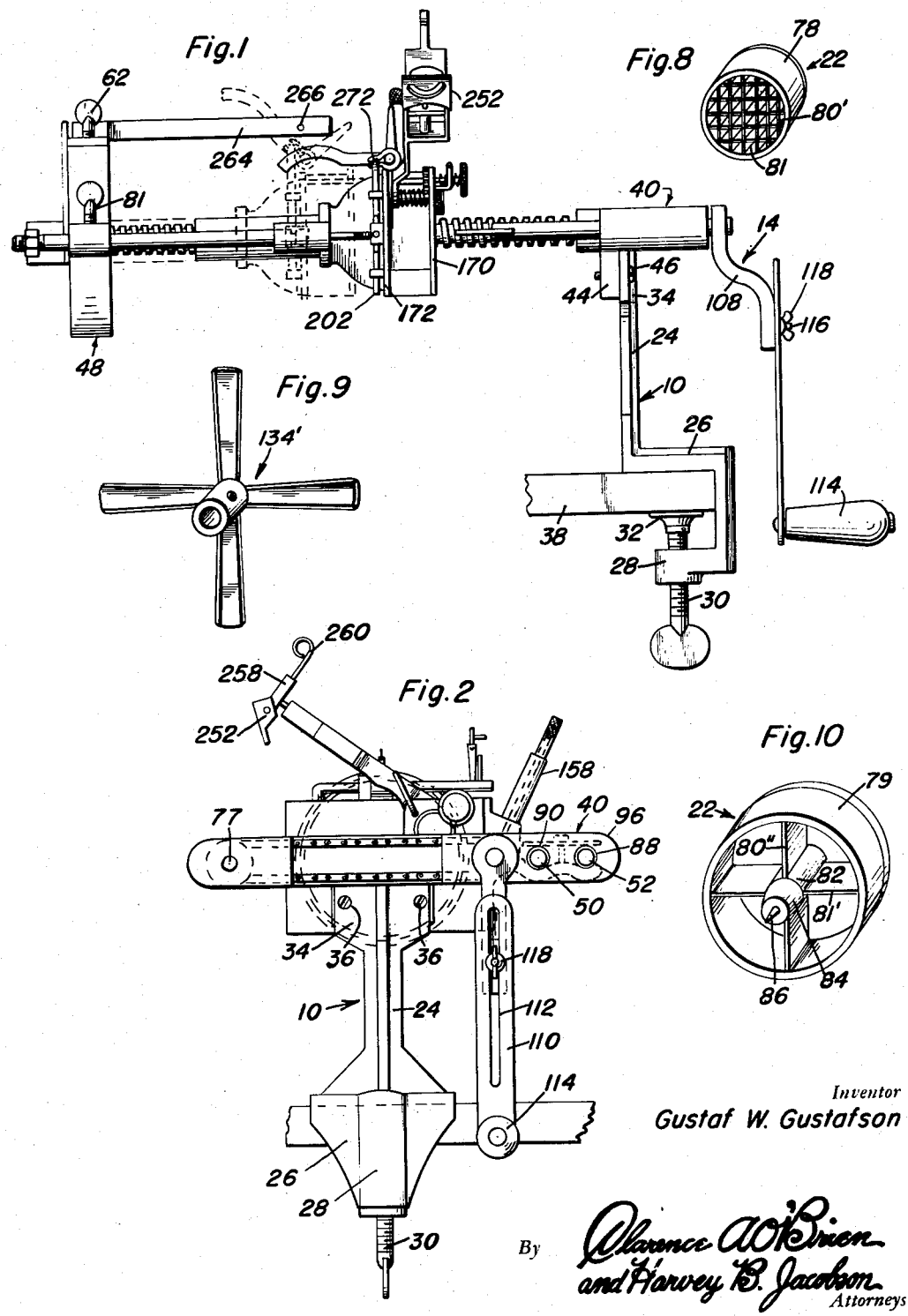
Inventor
Gustaf W. Gustafson

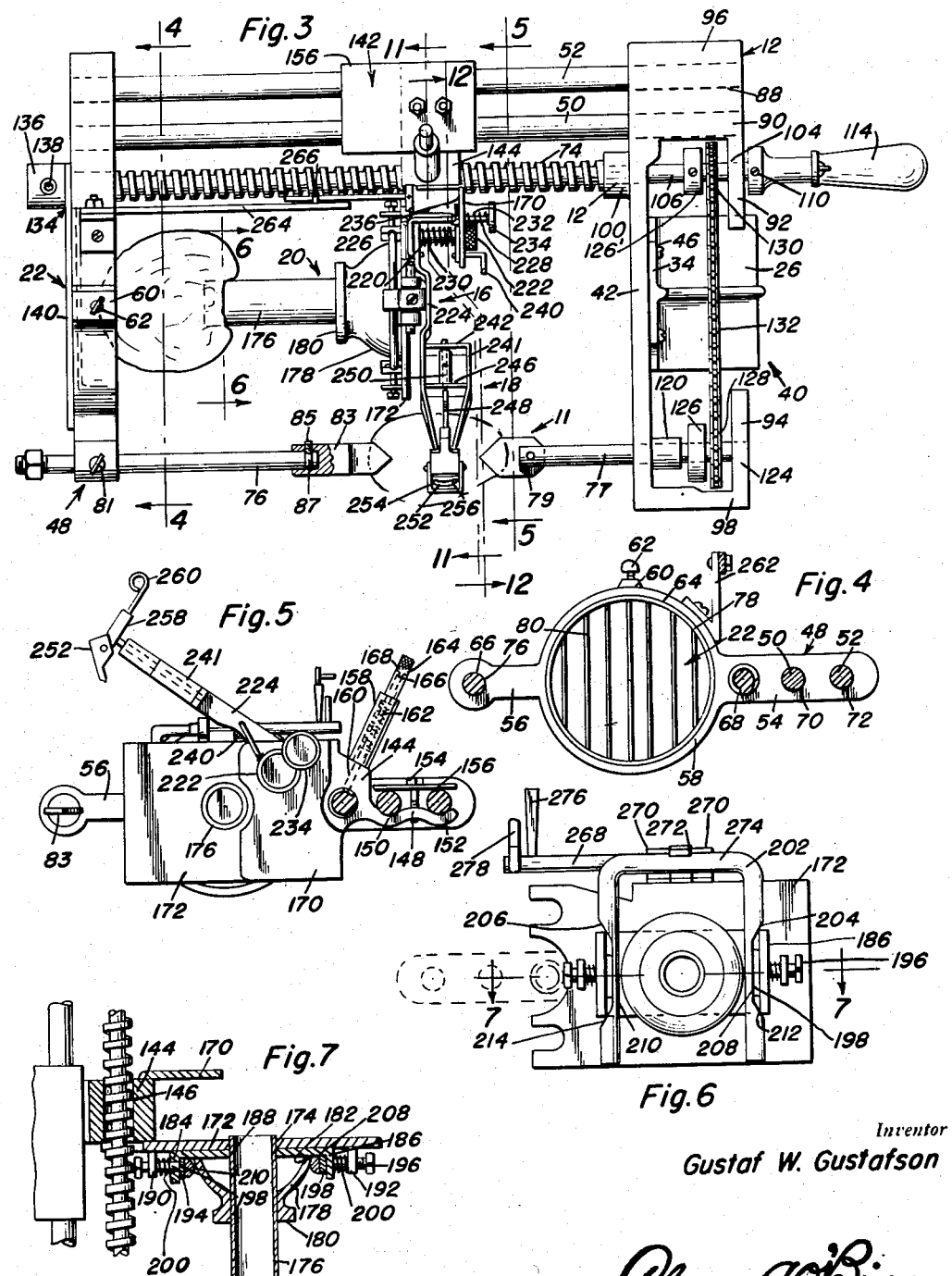

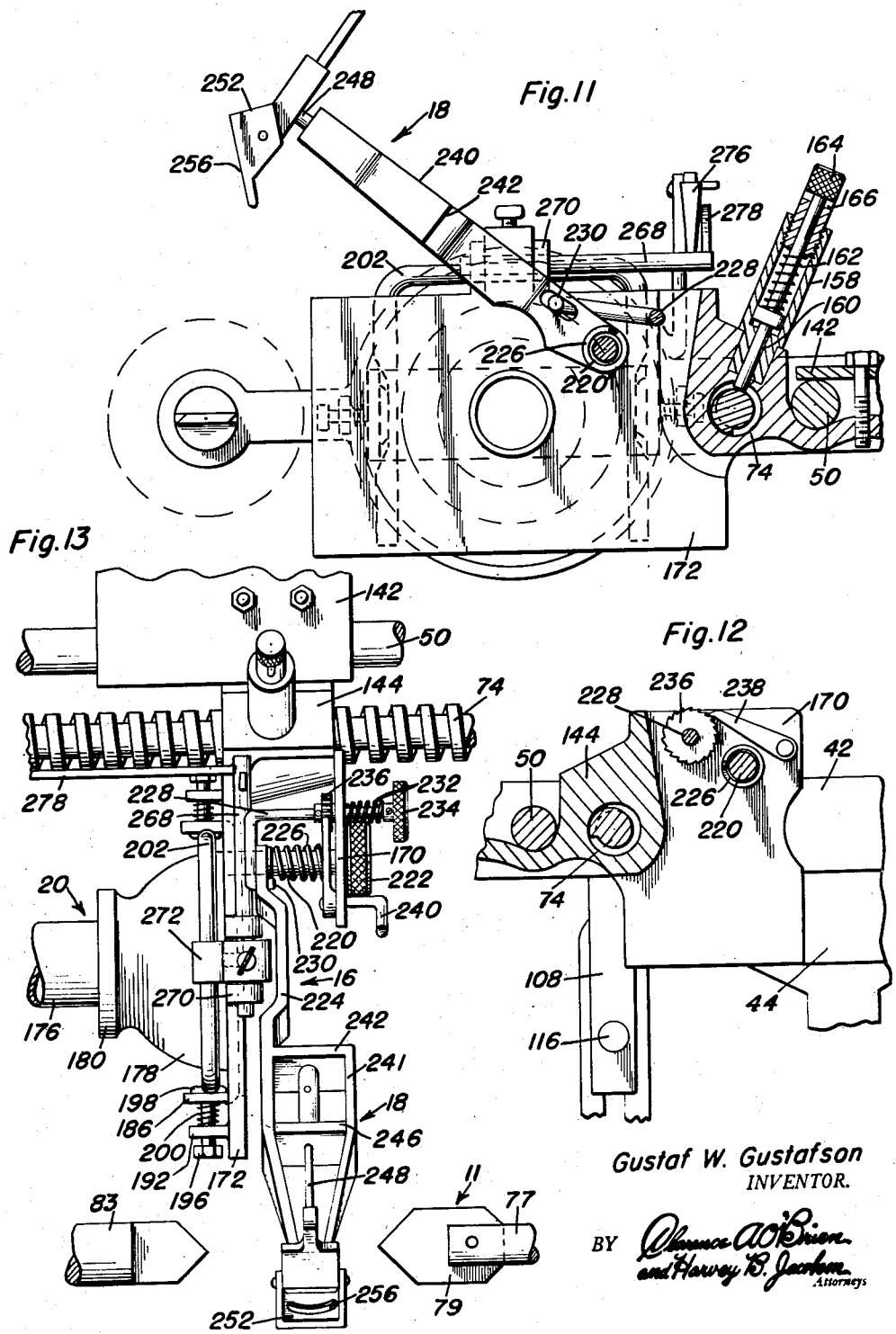

_United States Patent Office_

2,693,210
Patented Nov. 2, 1954

2,693,210

FRUIT AND VEGETABLE COVER, SEGMENTER AND SLICER

Gustaf W. Gustafson, Joliet, Ill.

Application October 30, 1950, Serial No. 192,877

5 Claims. (Cl. 146—40)

The present invention relates to improvements in culinary devices and more particularly to a device which is adapted to peel, core, slice and dice vegetables or fruit.

An object of the present invention is to provide a novel culinary device which is adapted to be secured to a table or the like and which is manually operable for effectively peeling vegetables and fruit.

A further object of the present invention resides in the novel construction of a culinary device whereby one object may be peeled while a second object is being cored, sliced and diced.

A further object of the present invention is to provide a novel coring device whereby initial movement of the coring means effects removal of the core of the object while continued movement of the coring device effects releasing of the coring tube whereby the coring tube holder may continue to move against the object for forcing it through a plate grid for slicing the object.

Still another object of the present invention is to provide a novel cooperation between a cutting blade whereby, as an object is forced through a slicing grid, the cutter will effect dicing of the slices.

A still further object of the present invention is to provide a novel end plate for the frame whereby plate grids of various forms may be removably positioned for slicing the fruit or vegetable object as desired.

A further object of the present invention is to provide an arrangement whereby a peeling blade is longitudinally moved as the fruit or vegetable object is rotated, and wherein the peeling blade is resiliently pivotally mounted for manual movement to engagement with the fruit or vegetable object for peeling of the same.

Various other objects and advantages will become apparent from the detailed description to follow. The best form in which I have contemplated applying my invention is clearly illustrated in the accompanying drawings, wherein:

Figure 1 is a side elevational view of the entire device of my invention showing the coring means in its initial position and in its terminal position in dotted lines;

Figure 2 is an end elevational view of Figure 1;

Figure 3 is a top plan view of Figure 1;

Figure 4 is a vertical transverse sectional view taken substantially along the plane of line 4—4 of Figure 3;

Figure 5 is a vertical transverse sectional view taken substantially along the plane of line 5—5 of Figure 3;

Figure 6 is a vertical transverse sectional view taken substantially along the plane of line 6—6 of Figure 3;

Figure 7 is a horizontal longitudinal sectional view taken substantially along the plane of line 7—7 of Figure 6;

Figure 8 is a perspective detail view of one of the plate grids employed for slicing the vegetable or fruit object;

Figure 9 is a perspective detail view of a cutter to be employed in conjunction with the structure of the present invention;

Figure 10 is a perspective detail view of another form of plate grid;

Figure 11 is an enlarged vertical transverse sectional view taken substantially along the plane of line 11—11 of Figure 3;

Figure 12 is a vertical transverse sectional view taken substantially along the plane of line 12—12 of Figure 3; and, Figure 13 is an enlarged detail top plan view of the peeling and coring means.

Referring more particularly to the drawings, wherein like numerals designate like parts throughout, the numeral 10 designates generally the mounting means for supporting the structure of the present invention, the numeral 12 designates generally the frame supported by the mounting means 10, the numeral 14 designates generally the manual operating means, the numeral 16 designates generally the means mounted on the frame and actuated by the operating means for longitudinally moving the peeling and coring means, while the numerals 18 and 20 designate generally the peeling and coring means respectively, and the numeral 22 designates generally the plate grid means employed for slicing the fruit or vegetable objects.

Looking now at Figures 1 and 2, the mounting means 10 will be best seen as comprising a standard 24 having a C-clamp base 26. One arm of the C-clamp 26 is provided with a sleeve end 28 which is internally threaded for receiving the clamping element 30 which is provided with a flattened head 32. The upper end of the standard 24 is of enlarged area at 34 and has a pair of apertures 36 formed therein. The manner in which the mounting means 10 is secured to a table or the like 38 will be readily seen in Figure 1, and since such means are conventional, further description thereof is deemed unnecessary.

The frame means 12 is mounted for support by the mounting means 10 in the following manner. One end of the frame 12 is comprised of a housing 40 having a longitudinally extending inner wall 42. The inner wall 42 has a downwardly extending portion 44 which is provided with a pair of threaded apertures for receiving the screws 46 which extend through the apertures 36 in the enlarged portion 34 of the standard 24.

The frame 12 is further comprised of the end wall means 48 which is remote from the housing 40. The housing 40 and end wall 48 are connected by a pair of longitudinally extending support bars 50 and 52 which maintain the housing 40 and end wall 48 in fixed spaced relation.

The end wall 48 is best seen in Figure 4 and is of substantially elongated form at 54 and 56 with an enlarged portion at 58, the enlarged portion at 58 being provided with a substantially circular opening for receiving the slicer means to be hereinafter described. The enlarged portion 58 is provided with a boss at 60 with a set screw 62 threadably mounted therein and extending to the interior opening 64. The elongated portions 54 and 56 of the end wall 48 are provided with a plurality of bores 66, 68, 70 and 72. The bores 70 and 72 are adapted to receive the shafts 50 and 52 which are fixedly mounted therein. The bore 68 is adapted to receive the worm 74 for free rotation therein, while the bore 66 is adapted to slidably and adjustably receive the bar 76 which is for a purpose to be hereinafter described.

The slicing means 22 may be of various forms such as is shown in Figures 4, 8 and 10. Each of the slicing means 22 is comprised of an outer cylindrical element 78 and a plurality of grid plates 80 integrally formed with the cylindrical element 78. In Figure 4, the plates 80 are all parallel to each other and are adapted to slice the fruit or vegetable object as it moves longitudinally therethrough. In the form of Figure 8, the slicing means 22 is comprised of the cylindrical element 78' formed with a plurality of vertically extending grid plates 80' and also a plurality of horizontally extending grid plates 81, whereby the fruit or vegetable object passing therethrough will be sliced along a plurality of vertically and horizontally extending planes. Similarly, the form disclosed in Figure 10 is formed from a cylindrical element 79 with a single vertically extending grid plate 80″ and a single horizontally extending grid plate 81′. The center portions of the vertically and horizontally extending grid plates 80″ and 81′ are integrally formed with a substantially cylindrical element 82. The cylindrical element 82 has a gradually diametrically reduced extension 84 to which is integrally attached a pin 86 at its inner end.

It will be readily seen that any of the slicing means 22 shown may be positioned within the enlarged portion 58 of the end wall 48 and clamped therein by means of the set screw 62. Of course, various other forms of slicing means may be employed.

The housing 40 is of substantially elongated form and is provided with a pair of bores 88 and 90 which are in axial alignment with the bores 72 and 70, respectively, for receiving the opposite ends of the shafts 52 and 50 which are rigidly secured therein to form an integral frame structure 12. Parallel to the supporting wall 42 of the housing 40 are a pair of inwardly extending walls 92 and 94 which are integrally formed with the end portions 96 and 98 of the housing 40. Housing 40 is provided with a boss at 100 which is internally bored to provide a bearing at 102 which is in axial alignment with a second bore 104 in the wall portion 92. A worm 74 is provided with a bearing extension 106 which is rotatably supported by the bores 102 and 104. An arcuated handle element 108 is fixedly secured to the outer end of the extension 106 by means of the set screw or pin 110. The handle for the manual operating means 14 is best shown in Figures 1 and 2 as comprising an elongated flat strap 110 which is formed with an elongated slot 112. A handle 114 is rotatably secured to the lower end of the strap 110 by any conventional means. A screw 116 is formed with the arcuated element 108, extending therefrom and being receivable in the elongated slot 112 whereby a wing nut 118 may be threadably secured thereon for clamping the handle 114 the desired distance from the axis of rotation to give satisfactory leverage means.

The housing 40 is also provided with an internally extending boss 120 which is provided with a bore 122 which is in axial alignment with another bore 124 in the wall portion 94. A bar 77 is rotatably disposed in the bores 122 and 124 and has a collar 126 securely mounted thereon between the boss 120 and the sprocket 128. A similar collar 126' is secured to the extension 106 of the worm 74 between the wall 42 and the sprocket 130. A sprocket chain 132 extends over the pair of sprockets 128 and 130 whereby rotation of the worm 74 is accompanied by rotation of the bar 77 for a purpose to be hereinafter described.

The means for mounting the fruit or the vegetable object for peeling is designated generally at 11 and is best shown in Figure 3 as comprising the pair of bars 76 and 77. The inner end of the bar 77 is provided with a spear plate 79 which is adapted to engage the fruit or vegetable object for rotating the same upon rotation of the shaft 77 by means of the chain 132 and handle operating means 14. The other bar 76 is fixedly mounted in the bore 66 by means of the set screw means 81 for adjustable movement of the bar 76 for engagement with the fruit or vegeable object. The inner end of the bar 76 is provided with a spear end 83 which is freely rotatable but held from longitudinal movement on the bar 76 by means of the stop screw 85 which is received in the groove 87 adjacent the end of the bar 76. Thus, it will readily be seen that the fruit or vegetable object may be engaged on the spear end 79 of the bar 76 and the spear end 83 of the other bar 76 may then be moved into contact with the object and held in adjusted position by means of the set screw 81. It will now be possible to rotate the fruit or vegetable object by actuating the operating means 14.

As best seen in Figure 3, the end of the worm 74 remote from the extension 106 is provided with a cutter means 134. The cutter means 134 is comprised of a sleeve portion 136 which is fixedly secured to the worm end by means of the screw 138. Integrally formed with the sleeve 136 is the cutter blade 140 which is adapted to rotate with the worm 74 and is juxtaposed to the slicing means 22 for a purpose to be hereinafter described. The means shown in Figure 3 is of the single-blade type, but an alternative form is shown in Figure 9 as consisting of four radially extending blades. Of course, any number of blades may be employed as desired, depending upon the size of the diced fruit or vegetable desired.

The means 142 for supporting and longitudinally moving the coring means 20 and the peeling means 18 will now be described. As best seen in Figures 3 and 5, the means 142 comprises a block 144 which is provided with a smooth bore 146 for receiving the worm 74. Integrally formed with the block 144 and laterally extending therefrom is the plate 148 which is provided with a pair of dipped portions 150 and 152 which are adapted to slidingly engage the shafts 50 and 52 on their under sides. A bolt 154 is threadably engaged in the central portion of the plate 148 and has mounted thereon the abutment plate 156 which is adapted to overlie the shafts 50 and 52 for sliding and supporting engagement on the shafts. It will thus be seen that the peeling means 18 and coring means 20 will be longitudinally moved upon rotation of the worm 74, since the block 144 will be held from rotation therewith by means of the plate 148 slidingly engaged on the shafts 50 and 52. Fixedly mounted on the block 144 is the tubular housing 158 in which is reciprocably mounted a pin 160 which is adapted to extend through the block 144 for engagement with the threads of the worm 74. The pin 160 is resiliently urged to its engagement with the threads by means of a spring 162 within the tubular housing 158. Should it be desired that rotation of the worm not effect longitudinal movement of the block 144 and the associated means, the end 164 of the pin 160 may be pulled outwardly against the urging of the spring 162 and the projection 166 of the end 164 may be rotated for engagement with the surface 168 for maintaining the pin 160 out of engagement with the threads.

A pair of plates 170 and 172 are fixedly secured to the block 144 and laterally extend therefrom, as best seen in Figure 7.

The plate 172 is primarily adapted to mount the coring means 20 which will presently be described. The plate 172 is provided with a centrally disposed aperture 174 which is adapted to receive one end of the coring tube 176. A cup-shaped element 178 is fixedly secured to the plate 172 and has an enlarged flattened end 180 which is adapted to abut a fruit or vegetable object as will be hereinafter described. The cup-shaped element 178 is provided with a transversely extending slot 182 for slidingly receiving a pair of angulated plates 184 and 186. The coring tube 176 is provided with an annular groove 188 which is adapted to be engaged by the ends of the plates 184 and 186. Integrally formed on the plate 172 are a pair of apertured elements 190 and 192 in which are slidably mounted pins 194 and 196. The inner ends of the pins 194 and 196 extend through the angulated ends of the plates 184 and 186 and are held from outward movement therefrom by means of the enlarged heads 198. Coil springs 200 are disposed between the elements 190 and 192 and the angulated ends of the plates 184 and 186 for resiliently urging the plates into engagement in the annular groove 188.

Looking now at Figure 6, it will be seen that a substantially U-shaped bar 202 is provided for vertical reciprocation in juxtaposition to the plate 172. The leg portions of the U-shaped bar 202 are recessed on their outer surfaces at 204 and 206 to provide reduced portions 208 and 210 and cam surfaces 212 and 214. Looking now at Figures 6 and 7, it will be seen that vertical movement of the U-shaped bar 202 in conjunction with cooperation between the reduced portions 208 and 210 with the enlarged heads 198 will effect outward movement of the angulated plates 184 and 186 so that the coring tube 176 will be disengaged and free for axial movement with respect to the plate 172 for a purpose to be hereinafter described.

Attention is now directed to the plate 170 and the peeling means 18. The peeling means 18 is securely mounted on the pin 220 which is rotatably disposed in the plate 170 at one end and has its other end rotatably disposed in the plate 172. The pin 220 is provided with an enlarged head in the form of a disk 222 whereby the arm 224 of the peeling means 18 may be pivoted with the pin 220. A coiled torsion spring 226 is formed about the pin 220 and is adapted to resiliently urge the arm 224 downwardly whereby the cutter end of the peeling means 18 will resiliently engage the object to be peeled.

A second angulated pin 228 is rotatably disposed in the plate 170 and has its angulated end adapted to underlie the arm 224 at 230. The pin 228 is provided with a torsion spring 232 for normally urging the angulated end 230 upwardly whereby the arm 224 of the peeling means will also be upwardly urged in opposition to the coil spring 226. The spring 232 is also under compression for normally urging the disk head 234 outwardly to maintain the angulated end 230 in engagement with the under side of the arm 224. The pin 228 is also slidably mounted in the plate 170 whereby the disk 234 may be pushed inwardly against the urging of the spring 232 to disengage the angulated end 230 from the arm 224 of the peeling means 18.

A spur gear 236 is fixedly secured to the pin 228 for rotation therewith. A dog 238 is mounted on the angulated pin 240 which is rotatably disposed in the plate 170 whereby the dog may be rotated for engagement with the spur gear 236 for permitting rotation of the spur gear in a predetermined direction.

It will thus be seen that the peeling means 18 may be resiliently urged upwardly in opposition to the torsion spring 226 for positioning in an inoperative position and the dog 238 will engage the gear 236 for fixedly maintaining the peeling means in that position. If it be desired to employ the peeling means 18, the disk 234 is urged inwardly, thereby removing the angulated end 230 from engagement underneath the arm 224 and also disengaging the gear 236 from the dog 238. The arm 224 will then be free to be resiliently urged downwardly for engagement with a fruit or vegetable object.

The peeler means 18 is comprised of a framework 241 which is integrally formed with the arm 224 and has a pair of spaced bars 242 and 246. A rod 248 is swivelly mounted in apertures in the bars 242 and 246 and a spacer sleeve 250 is pinned to the rod 248 and mounted between the bars 242 and 246 for maintaining the rod 248 in predetermined relation to the arm 224. Secured to the outer end of the rod 248 is the peeler element 252 having a slot 254 provided with a cutting edge 256 for engagement with the object to be peeled. A handle element 258 extends from the peeling element 252 and terminates in an arcuated wire 260 which is adapted to be manually engaged for effecting peeling of the object.

Looking now at Figures 1 and 4, it will be seen that a bracket 262 is secured in upstanding relation to the enlarged portion 58 of the end wall 48. Longitudinally extending therefrom and fixedly secured to the upstanding bracket 262 is a flat elongated bar 264 which is provided with a laterally extending pin 266 adjacent one end.

As seen in Figure 6, a rod 268 is transversely disposed and rotatably mounted within a pair of sleeves 270 which are fixedly secured to the plate 172. The rod 268 has a laterally extending clamp 272 mounted thereon for engagement with the bight portion 274 of the U-shaped member 202. The extremity of the rod 268 is provided with an upstanding trip rod 276 and an arcuated rod 278 which is disposed at substantially a right angle with respect to the upstanding rod 276.

It will readily be seen from an examination of Figure 1 that as the supporting mechanism for the coring device and the peeling means are moved longitudinally on the frame and worm, the upstanding rod 276 will engage the pin 266 on the longitudinally extending bar 264, thereby effecting pivoting movement of the rod 268 and clamp 272. As a result thereof, the bight portion 274 of the U-shaped element 202 will be moved upwardly and the cam surfaces 214 and 212 will engage the enlarged heads 198 on the pins 194 and 196, urging them outwardly and effecting outward movement of the angulated plates 184 and 186. The outward movement will retract the angulated plates from the annular groove 188 in the coring tube 176.

In view of the foregoing, one skilled in the art will readily understand the operation of the coring and slicing means. Initial longitudinal movement of the coring means 20 will effect coring of the object in the manner shown in Figure 3. Continued movement of the coring means will complete coring of the object and the coring tube 176 will approach the slicing means 22 as a limit. At this time, the upstanding rod 276 will engage the pin 266 and will be pivoted thereby and will release the coring tube 176 as hereinabove set forth. Thus, continued movement of the cup 178 will be permitted until the flattened end 180 of the cup 178 engages the object being cored. Thereupon, the object will be forced through the slicing means 22 to be divided into a plurality of parts.

The actuating means for effecting longitudinal movement of the coring and peeling means and for rotating the object being peeled should be obvious from the drawings and the above description. The handle 114 is rotated and the worm 74 and parallel rod 77 will be simultaneously rotated by means of the chain 132. Thus, the object being peeled will be rotated with the rod 77 and the peeling means 18 and coring means 20 will move longitudinally on the worm 74 as above described. As the peeling means 18 moves over the vegetable or fruit which is to be peeled, the handle 260 is manipulated so that the cutting blade 256 removes the peeling from the object. Since the peeling element 252 is swivelly mounted with respect to the arm 224, it is possible to effectively remove the peeling from the object regardless of the contour thereof.

Referring once again to Figure 3, it will be seen that as the fruit or vegetable is forced through the slicing means 22, the cutter blade 140 will be rotated with the worm 74 and will transversely cut the object to produce diced pieces. Of course, as above stated, a cutter blade such as 134' shown in Figure 9 could be substituted for the single blade 140, and since the number of times an individual blade passes the sliding means 22 will be increased, the object will be cut a greater number of times in a transverse direction.

From the foregoing description, taken in conjunction with the drawings, it is believed that a device has been provided which will accomplish all of the objects hereinabove set forth.

Having described the invention, what is claimed as new is:

1. A device of the class described comprising end walls, longitudinally extending support bars maintaining said end walls in fixed relation, a longitudinally extending worm journaled in said end walls, a block mounted for longitudinal sliding motion on said worm, a guide plate on said block, said guide plate slidingly engaging said support bars, a drive pin resiliently mounted on said block, said drive pin being movable into and out of engagement with said worm for moving said block longitudinally of said worm, a mounting plate extending laterally of said block and extending transversely of the direction of movement of said block, a centrally disposed aperture in said mounting plate, a cup-shaped element fixed on said mounting plate, said cup-shaped element having a central aperture therein, said apertures being in aligned relation, a coring tube slidably mounted in said apertures, a latch plate slidably mounted on said mounting plate, said latch plate being slidable transversely of said apertures, an annular groove in said coring tube, means urging said latch plate into engaging relation with said groove and means operable to disengage said latch plate from said groove.

2. A device of the class described comprising a frame, mounting means secured to said frame, a worm rotatably mounted longitudinally of said frame, a block having a bore for slidably receiving said worm, means selectively connecting said block in operative relation to said worm whereby rotation of said worm will traverse said block along said worm, a laterally extending plate secured on said block, an annular pusher element secured on the side of said plate, said pusher element and said plate each having a centrally disposed aperture, said apertures being in alignment, a coring tube slidably mounted in said apertures, locking means mounted on said plate and engageable with said coring tube and operable to retain said coring tube in predetermined relation in said apertures, tripping means mounted on said plate and movable to disengage said locking means from said coring tube whereby said tube is free for longitudinal sliding movement in said apertures.

3. A device of the class described comprising a frame, mounting means secured to said frame, a worm rotatably mounted longitudinally of said frame, a block having a bore for slidably receiving said worm, means selectively connecting said block in operative relation to said worm whereby rotation of said worm will traverse said block along said worm, a laterally extending plate secured on said block, an annular pusher element secured on the side of said plate, said pusher element and said plate each having a centrally disposed aperture, said apertures being in alignment, a coring tube slidably mounted in said apertures, locking means mounted on said plate and engageable with said coring tube and operable to retain said coring tube in predetermined relation in said apertures, tripping means mounted on said plate and movable to disengage said locking means from said coring tube whereby said tube is free for longitudinal sliding movement in said apertures, a knife grill mounted on said frame in longitudinal alignment with said coring tube.

4. A device of the class described comprising a frame, mounting means secured to said frame, a worm rotatably mounted longitudinally of said frame, a block having a bore for slidably receiving said worm, means selectively connecting said block in operative relation to said worm whereby rotation of said worm will traverse said block along said worm, a laterally extending plate secured on said block, an annular pusher element secured on the side of said plate, said pusher element and said plate each having a centrally disposed aperture, said apertures being in alignment, a coring tube slidably mounted in said apertures, said coring tube having an annular groove in the outer surface thereof, a locking plate mounted on said laterally extending plate for sliding movement transversely to said coring tube, said locking plate being engageable with said groove to inhibit longitudinal movement of said coring tube in said apertures, resilient means urging said locking plate into engagement with said annular groove, tripping means mounted on said laterally extending plate, said tripping means being responsive to predetermined positioning of said pusher to disengage said locking plate from said groove to release said coring tube for longitudinal sliding movement in said apertures.

5. A device of the class described comprising a frame, mounting means secured on said frame, a worm rotatably mounted longitudinally of said frame, a block having an aperture receiving said worm, said block being longitudinally slidably on said worm, means on said block engaging said frame for inhibiting rotation of said block, a clutch pin mounted in said block, said clutch pin being selectively movable into and out of engagement with said worm, a laterally extending plate secured on said block, a pusher element secured on the side of said plate, said pusher element and said plate each having an aperture, said apertures being longitudinally aligned, a coring tube slidably mounted in said aligned apertures, latching means mounted on said laterally extending plate and engageable with said tube to retain said tube in predetermined relation in said apertures, tripping means mounted on said laterally extending plate and operably connected to said latching means for disengaging said latching means from said tube whereby said tube is freed for telescoping movement in said aligned apertures, a knife grill mounted on said frame in longitudinal alignment with said pusher element, a knife blade movable transversely over said knife grill.

References Cited in the file of this patent

UNITED STATES PATENTS

| Number | Name | Date |
|---|---|---|
| Re. 9,930 | Law | Nov. 15, 1881 |
| 140,315 | Stewart et al. | June 24, 1873 |
| 251,982 | Whittemore | Jan. 3, 1882 |
| 423,318 | Heffron | Mar. 11, 1890 |
| 954,340 | Phillips | Apr. 5, 1910 |
| 1,001,931 | Cookson | Aug. 29, 1911 |
| 1,286,796 | Schaffer | Dec. 3, 1918 |
| 1,369,202 | Stoltenberg | Feb. 22, 1921 |
| 1,484,446 | Felizianetti | Feb. 19, 1924 |
| 2,506,802 | Magnuson et al. | May 9, 1950 |